United States Patent
Chen

(10) Patent No.: US 8,099,122 B1
(45) Date of Patent: Jan. 17, 2012

(54) METHOD AND APPARATUS FOR IMPROVED FORWARD LINK POWER CONTROL WHILE IN SOFT HANDOFF

(75) Inventor: Tao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 09/587,668

(22) Filed: Jun. 5, 2000

(51) Int. Cl.
   *H04B 7/00* (2006.01)
(52) U.S. Cl. ......... 455/522; 455/442; 455/524; 370/331
(58) Field of Classification Search .................. 455/436, 455/442, 437, 38.3, 38.1, 501, 574, 134, 455/522, 127.2, 524; 370/310–350
   See application file for complete search history.

(56) References Cited

U.S. PATENT DOCUMENTS

| | | | |
|---|---|---|---|
| 5,267,162 A | | 11/1993 | Ichikawa et al. |
| 5,469,471 A | * | 11/1995 | Wheatley, III ................ 348/725 |
| 5,884,187 A | | 3/1999 | Ziv et al. |
| 5,898,682 A | * | 4/1999 | Kanai ........................... 370/331 |
| 5,912,884 A | * | 6/1999 | Park et al. .................... 370/331 |
| 5,982,760 A | * | 11/1999 | Chen ............................. 370/335 |
| 6,144,841 A | * | 11/2000 | Feeney ............................ 455/69 |
| 6,147,981 A | * | 11/2000 | Prescott ........................ 370/318 |
| 6,154,659 A | * | 11/2000 | Jalali et al. .................... 455/522 |
| 6,178,164 B1 | * | 1/2001 | Wang et al. .................... 370/331 |
| 6,249,683 B1 | * | 6/2001 | Lundby et al. ................. 455/419 |
| 6,278,882 B1 | * | 8/2001 | Choi .............................. 455/453 |
| 6,324,207 B1 | * | 11/2001 | Kanterakis et al. ........... 370/332 |
| 6,473,619 B1 | * | 10/2002 | Kong et al. ................. 455/456.1 |
| 6,498,785 B1 | * | 12/2002 | Derryberry et al. .......... 370/311 |
| 6,515,975 B1 | * | 2/2003 | Chheda et al. ................ 370/332 |
| 6,545,986 B1 | * | 4/2003 | Stellakis ........................ 370/318 |
| 6,567,391 B1 | * | 5/2003 | Moon ............................ 370/342 |
| 6,571,104 B1 | * | 5/2003 | Nanda et al. .................. 455/522 |
| 6,678,530 B1 | * | 1/2004 | Hunzinger .................... 455/522 |

FOREIGN PATENT DOCUMENTS

| | | |
|---|---|---|
| EP | 0940932 A2 | 9/1999 |
| EP | 0949768 A2 | 10/1999 |
| JP | 11331072 | 11/1999 |
| WO | WO9859433 | 12/1998 |
| WO | 99/52310 | 10/1999 |
| WO | WO0008869 | 2/2000 |

* cited by examiner

*Primary Examiner* — Charles Appiah
*Assistant Examiner* — Jaime Holliday
(74) *Attorney, Agent, or Firm* — Thomas R. Rouse; Charles E. Eggers

(57) ABSTRACT

Forward power control is improved by increasing forward power control feedback channel reliability when the mobile unit in a wireless communication system is in soft handoff. Forward power control is enhanced by decreasing the bit error rate of forward power control bits received by the base station. The bit error rate of forward power control bits is reduced by raising the power level, and thus the signal to noise ratio, of the reverse pilot channel, while maintaining the power levels of other reverse channels. The signal to noise ratio of the reverse pilot channel is raised by the base station in response to a frame error rate decrease generated by the selector component of the base station controller. The base station maintains the power level of other reverse channels by reducing the power level gain of other reverse channels relative to the reverse pilot channel.

6 Claims, 3 Drawing Sheets

METHOD AND APPARATUS FOR IMPROVED FORWARD LINK POWER CONTROL WHILE IN SOFT HANDOFF

BACKGROUND OF THE INVENTION

I. Field of the Invention

The disclosed embodiments relate to wireless communications. More particularly, the disclosed embodiments relate to a novel and improved method of forward link power control in a wireless communication system.

II. Background

Power control in a wireless communication system is advantageous for many reasons. For example, battery power conservation in a wireless communication device is optimized by controlling the transmitter output power such that the device does not transmit with excessive power. In addition, lowering the transmission output power decreases the interference to other wireless communication devices.

In certain wireless communication systems, such as a code division multiple access (CDMA) communication system, power control is absolutely essential. As those skilled in the art can appreciate, CDMA technology assigns statistically uncorrelated binary sequences, sometimes referred to as pseudo-random sequences, to each wireless communication device. The data signal from a CDMA device is modulated in a pseudo-random fashion using the pseudo-random sequences such that a receiver can demodulate using the same pseudo-random sequence to recover the data signal while any other signals are decoded as noise. Thus, an increase in the power of signals will also increase the noise at any given device.

If one CDMA device increased its transmission power, the signal for that particular device would increase, but at the cost of a decreased signal-to-noise ratio (SNR) for every other user. That is, an increased signal for one user results in increased noise for every other user and vice versa. To offset this decrease in SNR, each of the other users must increase their signal power, which in turn will increase the noise level for all users. It is therefore easy to appreciate the importance of each user providing the correct amount of signal power required and no more. As a result, it is essential to transmit at the lowest possible power level that will still allow acceptable quality of communication. In addition, the channel usually changes with time and the received power can change rapidly thus requiring a dynamic power control mechanism. An exemplary power control technique is described in U.S. Pat. No. 5,267,162 assigned to the assignee of the present invention and fully incorporated herein by reference.

Power control in a forward link (from a base transceiver subsystem to a wireless device) of a CDMA system is particularly difficult during handoff. In a "soft" handoff, the wireless device may be communicating with two or more base transceiver subsystems (BTS). If forward link power control is not adequately regulated, the BTSs can transmit at radically different power levels resulting in an overall system imbalance. A known contributor to unbalanced forward link transmit power is the current Or-Of-Down logic implementation, described herein below, used to control reverse link (from a wireless device to a base transceiver subsystem) power levels. Forward link power control commands transmitted on the reverse link cannot be properly received by a BTS if the reverse link transmit power is inadequate.

In CDMA soft handoff, different BTSs command the wireless device, or mobile unit, to raise or lower its power level depending on the quality of the signal received by each BTS while the mobile unit transmits one signal to multiple BTSs. Depending on the location and channel conditions of the BTSs, the different BTSs receive different SNRs or signal quality in general. Each BTS decodes received frames and decides if the frame is good or bad, depending on encoded error correction information. If the base station has multiple sectors, the signals from the different sectors are combined before the decoding. In general, each BTS is making frame quality decisions based on the level of reception quality, which is a product of the SNR, or level of interference. Each BTS measures SNR and decides if the received signal quality is acceptable. The BTS commands the mobile unit to transmit the power level desired by the BTS to maintain acceptable received signal quality. Each BTS has its own target level of desired quality set by a Selector system component typically located in a Base Station Controller (BSC).

The mobile unit combines the transmit power level commands it receives from all the BTSs involved in soft handoff using OR-of-down logic. OR-of-down logic is a logical ORing of the down commands, or instructions, from the BTSs to reduce transmit power. If one base station with good receive signal quality tells the mobile unit to go down in power, the mobile unit reduces power regardless of commands from other BTSs with poor received signal quality to increase transmit power. OR-of-down logic causes the mobile unit to transmit at the power level desired by the base station requesting the lowest power level. Generally, all the BTSs except one do not get a desired level of received signal quality because the mobile unit will continue to reduce transmit power until the last BTS stops commanding it to reduce power. The received signal quality of the other BTSs is typically not as good as the signal quality received by the BTS receiving the best signal quality. If the BTS received signal quality is not good enough, the BTS cannot correctly detect the reverse link (mobile unit to BTS) power control bits, which indicate to the BTS whether or not to increase or decrease its forward link transmit power level. A problem is created when incorrectly detected power control bits cause a BTS power level to fail to move up and down with the other BTSs involved in a soft handoff because the BTS transmit levels become divergent. Divergent power levels restrict the ability of the mobile unit to combine the BTS signals. Ideally, all the BTSs involved in a soft handoff must have a minimum received power control bit signal quality from the same mobile unit for a reliably balanced forward link.

Therefore, it can be appreciated that there is a significant need for a method that controls forward link power in a wireless communication system providing improved feedback quality so that every base station can listen to the same mobile unit in soft handoff equally well.

SUMMARY OF THE INVENTION

The disclosed embodiments provide these advantages, as will be apparent from the following description and accompanying figures.

The disclosed embodiments are directed to improving forward link power control by increasing the feedback channel reliability when the mobile unit station in a wireless communication is in soft handoff. Improved forward link power control feedback reliability increases the effectiveness of the forward link power control and the efficiency of the forward link, which in turn reduces the interference to other users and systems and increases the system capacity.

Accordingly, in one aspect of the invention, a method for forward link power control in a wireless communication system during soft handoff, advantageously includes: detecting a quality of a signal received at a base station transceiver subsystem engaged in a soft handoff of a communication with a wireless device, instructing the base station transceiver subsystem to improve the signal quality if the quality is below a predefined target signal quality, instructing the wireless device to increase a pilot channel transmit power level, and, instructing the wireless device to decrease a power gain of other channels in relation to the pilot channel.

In another aspect of the invention, an apparatus for forward link power control in a wireless communication system, advantageously includes: a first processor configured to detect a quality of a signal received at a base station transceiver subsystem engaged in a soft handoff of a communication with a wireless device and to instruct the base station transceiver subsystem to improve the signal quality if the quality is below a predefined target signal quality; and a second processor coupled to the first processor and configured to instruct the wireless device to increase a pilot channel transmit power level, and to decrease a power gain of other channels in relation to the pilot channel.

In another aspect of the invention, a base station controller configured to engage in a soft handoff of a communication with a wireless device advantageously includes: a processor; and a storage medium coupled to the processor and containing a set of instructions executable by the processor to detect a quality of a signal received at a base station transceiver subsystem engaged in a soft handoff of a communication with a wireless device; and instruct the base station transceiver subsystem to improve the signal quality if the quality is below a predefined target signal quality.

In another aspect of the invention, a base station transceiver subsystem configured to engage in a soft handoff of a communication with a wireless device advantageously includes: a processor; and a storage medium coupled to the processor and containing a set of instructions executable by the processor to detect a quality of a signal received at a base station transceiver subsystem engaged in a soft handoff of a communication with a wireless device; instruct the base station transceiver subsystem to improve the signal quality if the quality is below a predefined target signal quality; instruct the wireless device to increase a pilot channel transmit power level; and instruct the wireless device to decrease a power gain of other channels in relation to the pilot channel.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION OF THE PREFERRED EMBODIMENTS

Power control of each component in a code division multiple access (CDMA) communication system is vital to provide optimal operation for the entire system. As is well known in the art, CDMA wireless systems provide power control of all mobile units as well as a base transceiver subsystem. Data is transmitted from the BTS to the mobile unit on a "forward" link while data is transmitted from the mobile unit to the BTS on a "reverse" link. Conventional CDMA systems provide power control on both the forward link and the reverse link. The transmission power of the BTS is controlled through feedback on the reverse link while the transmission power of the mobile unit is controlled through feedback on the forward link.

Power control during a soft handoff is complex because the mobile unit is communicating with more than one BTS. A soft handoff is defined herein as a simultaneous communication of a given mobile unit with two or more BTSs. The presently disclosed embodiments provide improved methods of power control in the forward link during a soft handoff. However, the power control system of the disclosed embodiments may be used at other times to control and balance transmission power in a wireless communication system.

Figure 1:
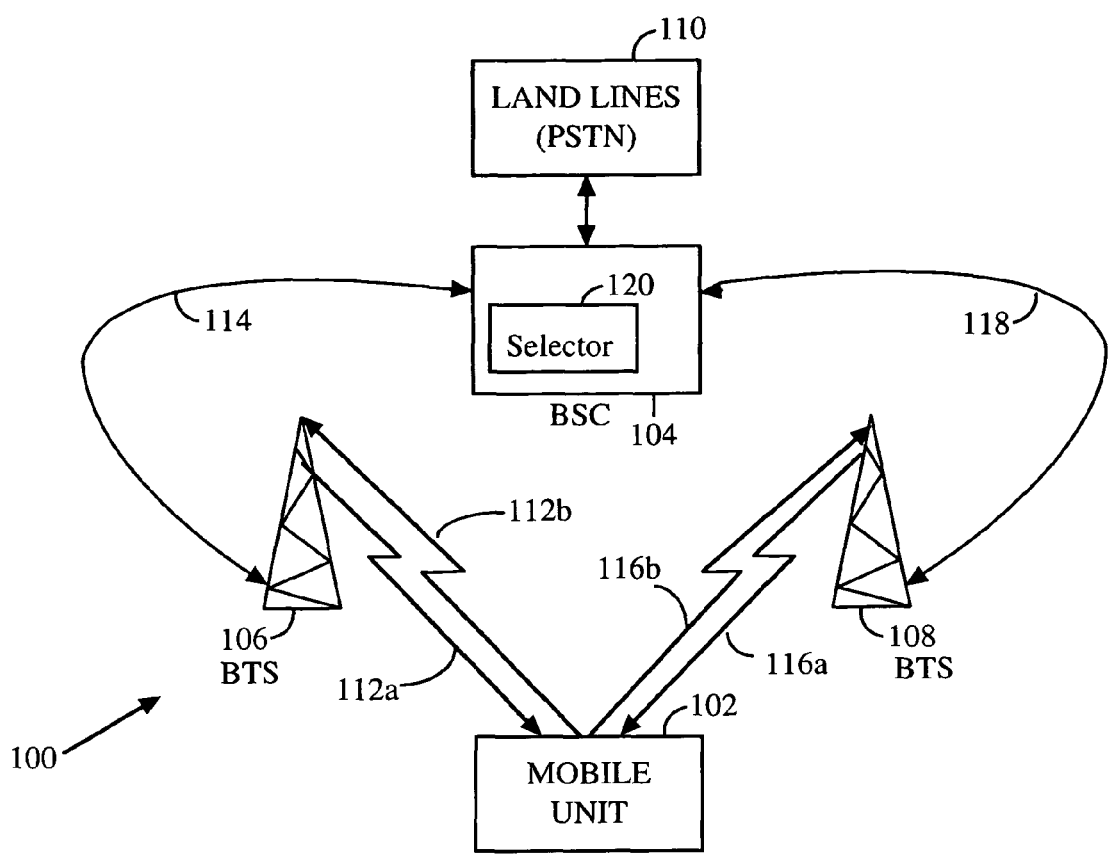
FIG. 1 illustrates the operation of a wireless communication system during a two-way handoff process.

FIG. 1 illustrates the operation of a system 100 in accordance with one embodiment to control forward link power during a soft handoff. During a soft handoff, a mobile unit 102 communicates with a BTS 106 and a BTS 108 in a conventional fashion. That is, data frames are exchanged between the mobile unit 102 and the BTS 106 and the BTS 108. The mobile unit 102 is initially communicating solely with the BTS 106. As the mobile unit 102 changes location and begins to communicate with the BTS 108, the power control (PC) bits from mobile unit 102 are received by both BTS 106 and BTS 108.

A mobile unit 102 is communicating with a base station controller (BSC) 104 via the base transceiver subsystem (BTS) 106 and/or the BTS 108. A wireless communication link 112 couples the mobile unit 102 with the BTS 106. It should be understood that the wireless communication link 112 includes both a forward link 112a and a reverse link 112b. The BTS 106 communicates with the BSC 104 via a conventional bi-directional communication link 114, or backhaul, in a well-known fashion. The Base Station Controller BSC 104 is coupled to a land line 110, such as a public switched telephone network (PSTN). The operation of the BSC 104 in communicating via the land line 110 is well known and need not be described in greater detail herein.

FIG. 1 also illustrates a wireless communication link 116 between the mobile unit 102 and the BTS 108. It should be understood that the wireless communication link 116 includes both a forward link 116a and a reverse link 116b. The BTS 108, in turn, communicates with the BSC 104 via a conventional bi-directional communication link 118, or backhaul. The system 100 is particularly useful during a soft handoff because it provides a technique for balancing transmission power of the BTS 106 and the BTS 108. The following description assumes that the mobile unit 102 initially communicates with the BSC 104 via the BTS 106. As the mobile unit 102 moves in the general direction of the BTS 108, the wireless communication link 116 will be established. Under these circumstances, the mobile unit 102 is communicating with both the BTS 106 and the BTS 108. While the mobile unit 102 is communicating with both the BTS 106 and the BTS 108, elements within the BSC 104 analyze the data received from each BTS to determine which BTS 106, 108 is most appropriate for continued communication with the mobile unit.

The BSC 104 includes a Selector element 120 which analyzes data being transmitted from the BTS 106 and the BTS 108. In an exemplary embodiment, the selector 120 analyzes data frames transmitted from the BTS 106 and the BTS 108 during a soft handoff to determine which BTS 106, 108 has the best received reverse link frame from the mobile unit 102 that should be passed onto land line 110. The selector element 120 sets the desired SNR of the BTS 106, 108. The SNR desired of each BTS 106, 108 changes based on the selector's 120 perception of momentary signal quality that forms a common signal quality target for all the BTSs 106, 108.

The mobile unit 102 controls the forward link transmission power of the BTS 106 on the reverse link of the wireless communication link 112b. This is accomplished in a known fashion by transmitting PC commands from the mobile unit 102 to the BTS 106, 108. The PC commands are usually embedded in frames containing data to be transmitted. In a typical CDMA system, each frame includes sixteen independent PC commands. Each PC command may be in the form of a single bit (i.e., a PC bit) or multiple bits. The BTS 106 responds to the PC bits by increasing or decreasing the transmit power of the BTS 106. As is known in the art, the transmit power of the BTS 106 may be incremented in predetermined steps in response to the PC commands. For example, the transmitter (not shown) may be controlled in one-quarter decibel (dB) increments, one-half dB increments, or one dB increments. Depending on the predetermined increment level, the BTS 106 increases or decreases the transmit power in response to the PC bits in the data frame.

As is well known in the art, the voice data may advantageously be encoded using error detection and/or error correction coding techniques to enhance operational performance. However, to minimize processing delay, the PC bits are not usually encoded. When the BTS 106 receives a strong signal from the mobile unit 102, the PC bits are generally received without error. If a BTS 106, 108 does not receive a strong signal from the mobile unit 102, the PC bits may be received in error. Excessive numbers of erroneously received PC bits prevent a BTS 106, 108 from correctly following the power control feedback from the mobile unit 102.

The PC bits may be incorrectly interpreted by either the BTS 106 or the BTS 108 due to noise. For example, the mobile unit 102 may broadcast a plurality of PC bits to instruct the BTS 106, 108 to increase power. However, due to an erroneous decision, the BTS 108 may interpret those same PC bits as power decrease commands. Under these circumstances, the BTS 106 having correctly received the PC bits would increase its transmission power while the BTS 108 would decrease its transmission power by a corresponding amount. The result is uneven transmit levels across different BTSs 106, 108, which decreases the efficiency of the system 100.

Frequently, one BTS 106, 108 involved in a soft handoff will correctly detect the forward link PC bits it receives while the others may not, as one BTS 106, 108 will always be relatively closer to the mobile unit 102 or have better channel conditions than the others. The mobile unit 102 combines all the PC commands it receives from each BTS 106, 108 involved in soft handoff using Or-Of-Down logic. Or-Of-Down logic is a logical Oring of the PC bits instructing the mobile unit 102 to reduce transmit power on the reverse link 112b, 116b. If one BTS 106, 108 with good receive signal quality tells the mobile unit 102 to go down in power, the mobile unit 102 reduces power regardless of commands from other BTSs 106, 108 with poor received signal quality to increase reverse link transmit power. OR-Of-Down logic causes the mobile unit 102 to transmit at the power level desired by the BTS 106, 108 requesting the lowest power level. Generally, all the BTSs 106, 108 except one do not get a desired level of received signal quality on the reverse link. The received signal quality of the remaining BTSs 106, 108 is typically not as good as the signal quality received by the BTS 106, 108 receiving the best signal quality. If the BTS 106, 108 received signal quality is not good enough, the BTS 106, 108 cannot correctly detect the forward link PC bits, which indicates to the BTS 106, 108 whether or not to increase or decrease its transmit power level.

In FIG. 1, in accordance with one embodiment, BTS 106 and BTS 108 are both in communication with the mobile unit 102. One BTS 106 is receiving enough signal strength to correctly decode the forward link PC bits, while the other BTS 108 is not. As the mobile unit 102 changes location, the BTS 106, 108 receiving sufficient signal strength may alternate back and forth by frames. Both BTSs 106, 108 will stay in communication with the mobile unit 102. The frames received by the BTS 106, 108 are forwarded to the selector 120 via the communication links 114 and 118, respectively. The selector 120 looks at the data frames generated by both BTSs 106, 108. At least one frame will generally be good if at least one BTS 106, 108 has good signal quality, or both may be the same if both BTSs 106, 108 receive good signal quality. The selector 120 selects a good frame or the best frame for transmission via the land line 110. If more than one frame is good, the "best" frame is selected using conventional techniques. For example, the selector 120 may select the best frame based on error detection data. As is known in the art, the frame includes a cyclic redundancy check (CRC) or other error detection/correction data that is used to check the accuracy of the data within the frame. The selector 120 will select the frame whose CRC indicates valid data. If the CRC indicates that both frames are good and the frames are different, the selector 120 may use other techniques, such as selecting the signal with the highest SNR. Various techniques used to select the best frame are known in the art. The disclosed embodiments are not limited by the specific technique used to select the best frame.

A data frame received in error is known as an erasure. If data frames sent to the selector 120 from both BTSs 106, 108 are erasures, the frame is lost. If any of the BTSs 106, 108 receives a good frame, the frame is not lost at the selector 120. The result of BTSs 106, 108 working together in soft handoff produces a composite erasure record. The selector 120 utilizes the composite erasure record to set target SNRs for the BTSs 106, 108. This process, whereby the selector 120 examines the composite erasure record of the reverse links 112b, 116b and sets the target SNRs for all of the BTSs 106, 108 in communication with a given mobile unit 102, is known as an outer loop. The target SNR set by the selector 120 for a BTS 106, 108 is used by the BTS 106, 108 to control the reverse link power level commands transmitted to the mobile unit 102. This process, whereby the BTS 106, 108 measures the SNR, compares it with a target SNR, and generates power control feedback based on the comparison, is known as an inner loop. The response of the mobile unit 102 to the reverse link PC commands (up or down) dictates the SNR of the reverse link. If the selector 120 cannot meet its target Frame Error Rate (FER) at the current reverse link 112b, 116b power level, the selector 120 will increase its target SNR by sending PC commands to the mobile unit 120 to increase power on the reverse link 112b, 116b. If the BTS 106, 108 meets it target FER at the current reverse link power level, the BTS 106, 108 will decrease its SNR by commanding the mobile unit 120 to reduce power on the reverse link 112b, 116b. A staircase shaped power feedback signal is created in this manner. If all the BTSs 106, 108 can correctly receive the forward link PC bits, all of the BTSs 106, 108 can synchronously follow the staircase-shaped power feedback from the mobile unit 102 created by the adjustments, and the power in the system remains balanced.

The presently disclosed embodiments provide a method of balancing the forward link power by increasing the target SNR of the forward link PC bits transmitted to all the BTSs 106, 108 so that all BTSs 106, 108 involved in a soft handoff receive the PC bits correctly. The presently disclosed embodiments achieve the increase of SNR of the forward link PC bits transmitted to the BTSs 106, 108 while maintaining the traffic channel and all other channels at the same power level.

The system 100 advantageously adjusts mobile unit transmission power levels to prevent errors in PC data from the mobile unit 102, such that errors in PC data do not result in BTS 106, 108 transmitter power being adjusted to drastically different power levels. The system 100 can be implemented in a variety of alternative embodiments and can be readily implemented using existing infrastructure. The system 100 can be readily implemented in accord with the Telecommunications Industry Association over-the-air interface standard TIA/EIA Interim Standard 95, and its derivatives, such as, e.g., IS-95B (hereinafter referred to collectively as IS-95), which defines power control messages, and is fully incorporated herein by reference.

While the above description relates to BTS 106 and BTS 108, those skilled in the art will appreciate that the principles of the disclosed embodiments can be extended to one or more additional BTSs.

Figure 2:
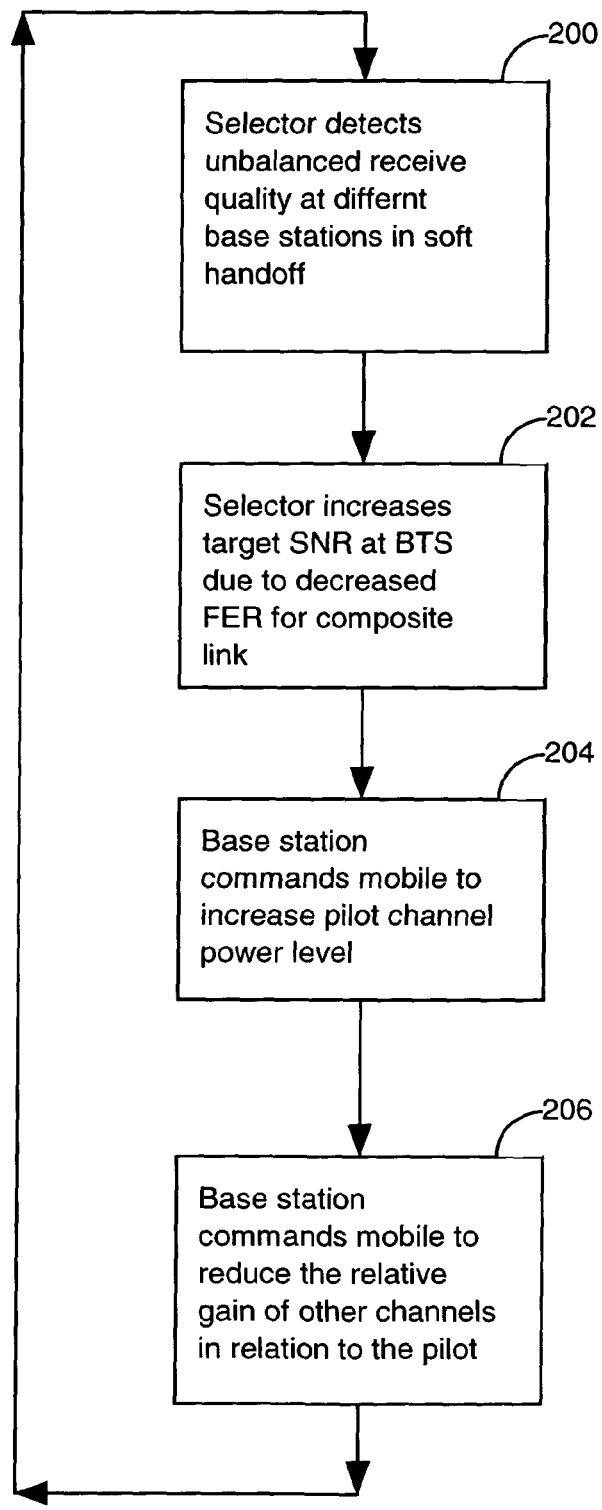
FIG. 2 is a flowchart diagram of a method for increasing reverse link pilot channel power levels while keeping reverse link traffic power levels constant.

FIG. 2 illustrates method steps in accordance with one embodiment. As previously discussed, the forward link power level is controlled by PC bits transmitted on the reverse link. The PC bits are contained in the reverse link power control sub-channel (RPCSCH). Every 1.25 milliseconds, a Power Control Group (PCG) containing one PC bit is transmitted on the RPCSCH. In every PCG, three quarters of the signal is reverse link pilot channel and one quarter of the signal is RPCSCH. The pilot channel is a constant value signal, carrying no information. The RPSCH carries the forward link power control bit command (up or down) generated by a mobile unit (not shown). The transmit power levels of the reverse link pilot channel and the RPSCH are identical, as they are transmitted on the same channel. The mobile unit transmits the traffic and other channels with a fixed delta relative to its pilot channel.

In step 200, a selector (not shown) detects a situation of uneven received quality for the RPCSCH at different BTSs (also not shown). The selector detects SNR below the desired level for correct PC bit detection at the BTSs with less than optimum received signal quality. Control flow proceeds to step 202.

In step 202, the selector sets target SNRs high enough for all the BTSs to get good data frame reception.

In one embodiment, the selector raises the target SNR by operating the BSC (not shown) outer loop normally with a decreased FER. In one embodiment, the FER corresponding to the necessary increase in SNR can be determined through simulation or laboratory measurement to create the following exemplary table for various fading scenarios:

| SNR | FER | BER of PC bit |
|---|---|---|
| S1 | 50% | X% |
| S2 | 25% | Y% |
| S3 | 10% | Z% |
| S4 | 5% | . |
| S5 | 1% | . |
| . | . | . |
| SN | N% | N% |

Averaging across tables or using the worst-case table (table requiring the largest FER target decrease), the BSC can advantageously interpolate the difference between the highest and lowest received SNR to determine the corresponding FER values.

In another embodiment, the selector raises the target SNR by operating the BSC outer loop without changing the target FER, but instead, operating a parallel BSC outer loop, or PC BER loop, that uses the PC Bit Error Rate (BER) to drive the desired reverse link SNR. The selector uses the higher of the SNR values determined by the traditional BSC outer loop and the PC BER loop. The BTS may determine the increased power level based on the RPCSCH bit error rate (BER) of the forward link PC bits. To determine the BER of the forward link PC bits, the BTS may use the method and apparatus for monitoring transmission quality described in U.S. Pat. No. _____ which is assigned to the assignee of the disclosed embodiments and fully incorporated herein by reference. By so monitoring the BER at the BTS, the actual BER of the PC bits and the exact amount of FER decrease to achieve the necessary power increase can be known.

The SNR of the BTSs with less than desired SNR can thus be increased by the selector. Control flow proceeds to step 204.

In step 204, the BTS commands the mobile unit to increase power on the RPCSCH (which contains both the reverse link pilot channel and forward link PC bits).

When the power level of the pilot channel is raised, the power level of all of the other channels is also raised in fixed relation to the pilot channel. The increased use of system power is acceptable and advantageous as it is limited to only a power increase on the RPCSCH by the following step. Control flow ten proceeds to step 206.

In step 206, the BTS commands the mobile unit to reduce the relative gain of all other channels in relation to the pilot channel. Only the power level of the pilot channel and the PCG transmitted on the RPCSCH remain raised after the reduction of the power levels of the other channels in relation to the pilot channel has been performed. In one embodiment, the forward link power control is based on the measurement of the reverse link pilot channel. The power level of the pilot channel transmitted from the mobile unit and the forward link PC BER is measured at the BTS. Based on the measurement and the target FER, the BTS commands the mobile unit to raise or lower the power level of the pilot channel. In order to achieve a higher received level of RPCSCH at the BTS, the selector raises the target SNR of the BTS. The BTS, in turn, raises the power level of the reverse link pilot channel and either simultaneously or subsequently reduces the power level of the other channels by adjusting their gain relative to the pilot channel.

The presently disclosed embodiments maintain an advantageous forward link PC BER at all the BTSs involved with the mobile unit, such that all the BTSs are able to listen to the mobile unit commanding increases or decreases in forward link power levels while continuing to implement OR-of-down logic and without significantly increasing the overall power of the system. The Or-of-down logic is retained while better reception of PC bits at intrinsically disadvantaged BTSs is achieved. The improved reception is advantageously achieved by setting a lower target FER for the BTSs. The system is provided with BTSs working synchronously to transmit at the same power level to the same mobile unit. The ability of the mobile unit to combine signals is enhanced by leveling the power of the forward links.

In one embodiment, the mobile unit transmits all channels with a fixed delta relative to its reverse link pilot channel. The BTS raises the power level of the RPCSCH by a delta, and also commands the mobile unit to reduce the relative gain of the other channels in relation to the pilot channel by the same delta.

In another embodiment, the BTS commands the mobile unit to reduce the relative gain of the other reverse link channels in relation to the pilot channel by slightly more than the same delta by which the mobile unit raised the reverse link pilot channel. The delta, or amount of power level decrease of the traffic channel, can actually be slightly greater than the delta of the pilot channel increase because the reverse link pilot channel is set at a level that provides all BTSs with the amount of SNR necessary to achieve the desired FER. In order to conserve system power, the reverse link pilot channel for a single mobile unit is not strong enough to be perfect. Conventionally, reverse link power is carefully balanced between pilot channel and traffic channels to use the minimum power required to achieve the desired FER. In accordance with one embodiment, the reverse link pilot channel is set to an artificially higher level, increasing the quality to near perfect quality. Since the reverse link pilot channel has a significantly higher SNR than a conventional reverse link pilot channel, the traffic channel can be demodulated with slightly less power than conventionally required. In conventional systems, some degradation due to the imperfect reverse link pilot channel causes some demodulation imperfection due to traffic noise. Problems caused by imperfect reverse link pilot channel quality are significantly reduced in accordance with one embodiment. Additional power savings can be realized on the reverse link traffic channel as the reverse link pilot channel improves. The power level of the reverse link traffic channel can be slightly lower, offsetting some of the increased use on the RPCSCH.

In yet another alternative embodiment, the method may not be applied to all mobile units, but only to mobile units that are receiving at high data rates.

The system returns to conventional forward power control upon completion of soft handoff.

Figure 3:
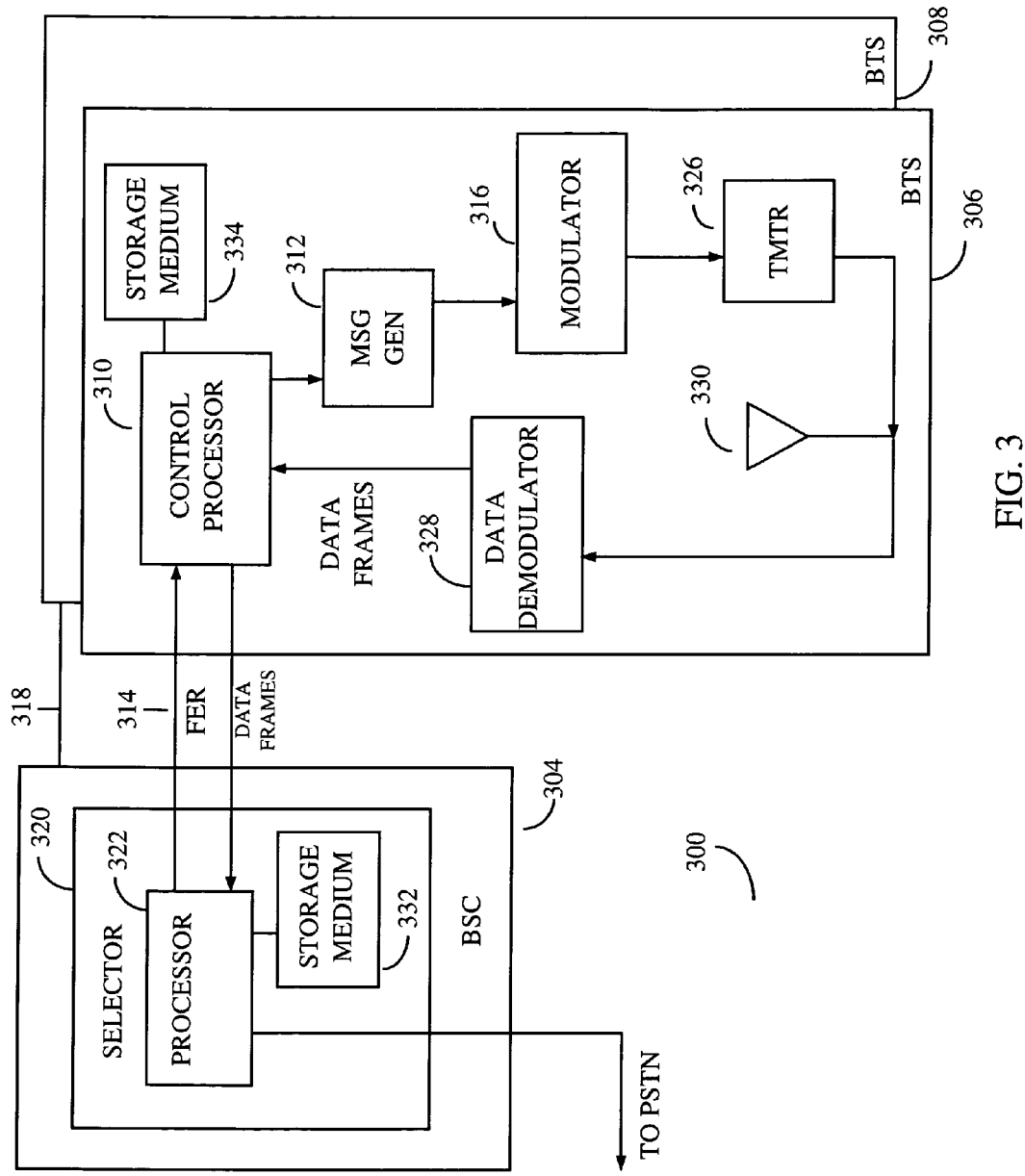
FIG. 3 is a block diagram of apparatus for improving the reliability of a reverse power control sub-channel.

FIG. 3 illustrates, an apparatus for improving the error rate of an RPCSCH while maintaining the level of power used by the traffic channel of a wireless communications system 300 during soft handoff.

Wireless communications signals are received by base station transceiver subsystems 306, 308 at antenna 330. Antenna 330 is advantageously a transducer that converts radio-frequency (RF) fields into alternating current (AC) or vice-versa. Antenna 330 intercepts RF energy and delivers AC to electronic equipment. The received analog signal reaches antenna element 330, is downconverted to a baseband analog signal, and is further converted to digital data frames containing forward link PC bits by data demodulator element 328.

After demodulation, the data frames pass to control processor 310. Control processor 310 calculates the SNR of the received signal and processes the data frames to calculate the BER of the forward power control bits. Control processor 310 performs its operations using a set of instructions contained in storage medium 334. One skilled in the art would understand that storage medium 334 could be integral to control processor 310.

Control processor 310 passes the received data frames to a control processor 322 of selector element 320 in a BSC 304 via a conventional bi-directional communication link 314, 318, or backhaul. Control processor 322 determines the FER for the composite communications link and determines target SNRs for the BTSs 306, 308. If the SNR of a BTS 306, 308 is too low for proper detection of the forward link PC bits, the control processor 322 of the selector 320 instructs the BTS to improve the signal quality by raising its target SNR. In one embodiment, the control processor 322 of the selector 320 instructs the BTS to improve the signal quality by raising the target SNR. In another embodiment, the control processor 322 of the selector 320 raises the target SNR of the BTS 306, 308 by decreasing the composite FER. Control processor 322 performs its operations using a set of instructions contained in storage medium 332.

One skilled in the art would understand that storage medium 332 could be integral to control processor 322. One skilled in the art would also understand that the functionality of the BSC 304 and the BTS 306, 308 could be incorporated in one device, which could be called a base station transceiver subsystem. It is understood by those of skill in the art that processors may encompass a digital signal processor (DSP), an application-specific integrated circuit (ASIC), discrete gate logic, firmware, or any conventional programmable software module and a microprocessor. The software module could reside in RAM memory, flash memory, registers, or any other form of storage medium known in the art. Alternatively, any conventional processor, controller, or state machine could be substituted for the microprocessor.

The control processor 322 of the BSC 304 is coupled to the control processor 310 of the BTS 306,308. When the control processor 322 of the BSC 304 raises the target SNR of the BTS 306, 308, the control processor 310 instructs the message generator 312 to generate a message to increase the power level of the reverse link pilot channel and a message to decrease the relative gain of reverse channels in relation to the pilot.

The messages are modulated by modulator 316 and transmitted to a mobile unit from antenna 330.

The presently disclosed embodiments provide a method to trade off the use of the same, or slightly more, reverse link transmit power for significantly improved forward link power control.

Thus, a novel and improved method and apparatus for improved forward link power control during soft handoff has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. As illustrated in FIG. 3, an exemplary processor 322, 310 is advantageously coupled to a storage medium 332, 334 so as to read information from, and write information to, the storage medium 332, 334. In the alternative, the storage medium 332, 334 may be integral to the processor 322, 310. The processor and the storage medium may reside in an ASIC (not shown). The ASIC may reside in a telephone (not shown). In the alternative, the processor 322, 310 and the storage medium 332, 334 may reside in a telephone. The processor 322, 310 may be implemented as a combination of a DSP and a microprocessor, or as two microprocessors in conjunction with a DSP core, etc.

The previous description of the preferred embodiments is provided to enable any person skilled in the art to make or use the disclosed embodiments. The various modifications to these embodiments will be readily apparent to those skilled in the art, and the generic principles defined herein may be applied to other embodiments without the use of the inventive faculty. Thus, the disclosed embodiments are not intended to be limited to the embodiments shown herein but are to be accorded the widest scope consistent with the principles and novel features disclosed herein.

I claim:

1. A method, comprising:
   detecting an unbalanced quality of power control signals from a wireless device simultaneously received at a plurality of base station transceivers involved in a soft handoff, wherein the unbalanced quality is determined based on qualities of power control signals from each of the plurality of base station transceivers involved in the soft handoff;
   increasing a target signal-to-noise ratio (SNR) of a reverse link pilot channel carrying at least one of the power control signals for at least one of the plurality of base station transceivers when the quality of the at least one of the power control signals for the at least one of the plurality of base station transceivers is below a predefined target signal quality;
   increasing a pilot channel transmit power level of the pilot channel transmitted by the wireless device during the soft handoff in response to the at least one of the plurality of base station transceivers; and
   decreasing a power gain of other channels transmitted by the wireless device in relation to the increased transmit power level of the pilot channel of the wireless device during the soft handoff, wherein the power gain of other channels in relation to the pilot channel is decreased by an amount that is more than an amount by which the pilot channel transmit power level is increased.

2. An apparatus, comprising:
   means for detecting an unbalanced quality of power control signals from a wireless device simultaneously received at a plurality of base station transceivers involved in a soft handoff, wherein the unbalanced quality is determined based on qualities of power control signals from each of the plurality of base station transceivers involved in the soft handoff;
   means for increasing a target signal-to-noise ratio (SNR) of a reverse link pilot channel carrying at least one of the power control signals for at least one of the plurality of base station transceivers when the quality of the at least one of the power control signals for the at least one of the plurality of base station transceivers is below a predefined target signal quality;
   means for increasing a pilot channel transmit power level of the pilot channel transmitted by the wireless device during the soft handoff in response to the at least one of the plurality of base station transceivers; and
   means for decreasing a power gain of other channels transmitted by the wireless device in relation to the increased transmit power level of the pilot channel of the wireless device during the soft handoff, wherein the power gain of other channels in relation to the pilot channel is decreased by an amount that is more than an amount by which the pilot channel transmit power level is increased.

3. A non-transitory computer readable medium comprising instructions for implementing a method, comprising:
   detecting an unbalanced quality of power control signals from a wireless device simultaneously received at a plurality of base station transceivers involved in a soft handoff, wherein the unbalanced quality is determined based on qualities of power control signals from each of the plurality of base station transceivers involved in the soft handoff;
   increasing a target signal-to-noise ratio (SNR) of a reverse link pilot channel carrying at least one of the power control signals for at least one of the plurality of base station transceivers when the quality of the at least one of the power control signals for the at least one of the plurality of base station transceivers is below a predefined target signal quality;
   increasing a pilot channel transmit power level of the pilot channel transmitted by the wireless device during the soft handoff in response to the at least one of the plurality of base station transceivers; and
   decreasing a power gain of other channels transmitted by the wireless device in relation to the increased transmit power level of the pilot channel of the wireless device during the soft handoff, wherein the power gain of other channels in relation to the pilot channel is decreased by an amount that is more than an amount by which the pilot channel transmit power level is increased.

4. A method, comprising:
   receiving a first forward link power control signal from a wireless device by a first base station transceiver involved in a soft handoff, wherein the first forward link power control signal is communicated over a first reverse link power control sub-channel of a first reverse link from the wireless device to the first base station transceiver;
   receiving a second forward link power control signal from the wireless device by a second base station transceiver involved in the soft handoff, wherein the second forward link power control signal is communicated over a second reverse link power control sub-channel of a second reverse link from the wireless device to the second base station transceiver, wherein the first and second forward link power control signals are transmitted by the wireless device simultaneously;
   increasing a target signal-to-noise ratio (SNR) of the first reverse link power control sub-channel when the detected quality of the first forward link power control signal is below a predefined target signal quality;
   detecting an unbalanced quality of the first and second forward link power control signals;

increasing a transmit power level of the first reverse link power control sub-channel in response to a command from the first base station transceiver to the wireless device;

and decreasing a power gain of other channels transmitted by the wireless device in relation to the increased transmit power level of the first reverse link power control sub-channel, wherein the power gain of other channels in relation to the first reverse link power control sub-channel is decreased by an amount that is more than an amount by which the first reverse link power control sub-channel transmit power level is increased.

5. The method of claim 4, wherein the target signal-to-noise ratio of the first reverse link power control sub-channel is increased without changing a target frame error rate associated with the first reverse link.

6. The method of claim 4, wherein the power gain of other channels in relation to the first reverse link power control sub-channel is decreased by an amount that is equal to an amount by which the first reverse link power control sub-channel transmit power level is increased.

* * * * *